United States Patent [19]

Lebre

[11] 4,120,076
[45] Oct. 17, 1978

[54] SYSTEM EMPLOYING A STRAP FOR STOWING CONTAINERS AGAINST A WALL

[76] Inventor: Charles Jean-Pierre Lebre, 35, rue de l'Orangerie, 91700 Ste Genevieve des Bois, France

[21] Appl. No.: 785,678

[22] Filed: Apr. 7, 1977

[30] Foreign Application Priority Data

Apr. 13, 1976 [FR] France ................................ 76 10763

[51] Int. Cl.² ........................................... A44B 21/00
[52] U.S. Cl. ................................... 24/68 CD; 254/79
[58] Field of Search ............. 24/68 R, 68 SB, 68 CD, 24/68 D, 69 R, 69 ST; 254/79

[56] References Cited

U.S. PATENT DOCUMENTS

| | | | |
|---|---|---|---|
| 2,540,888 | 2/1951 | Hyatt | 24/68 CD |
| 3,099,055 | 7/1963 | Huber | 24/68 CD |
| 3,128,516 | 4/1964 | Halvarson | 24/68 CD |
| 3,175,806 | 3/1965 | Prete | 24/68 CD |

Primary Examiner—Louis K. Rimrodt
Attorney, Agent, or Firm—Bacon & Thomas

[57] ABSTRACT

The invention provides a system for stowing, employing a strap, which comprises an anchoring device at one end of the strap and a tightening device with a lever and automatic locking means at the other end of the strap, the tightener comprising a casing having an opening through which passes the strap, two hooks located on either side of the casing and adapted to be engaged against the respective uprights of the containers to be stowed, and a lever constituted of two parts, movable with respect to each other, the part comprising the free end of the lever being retractable after the strap has been tightened. This system is suitable for stowing roll-containers in delivery trucks or other means of transport.

4 Claims, 2 Drawing Figures

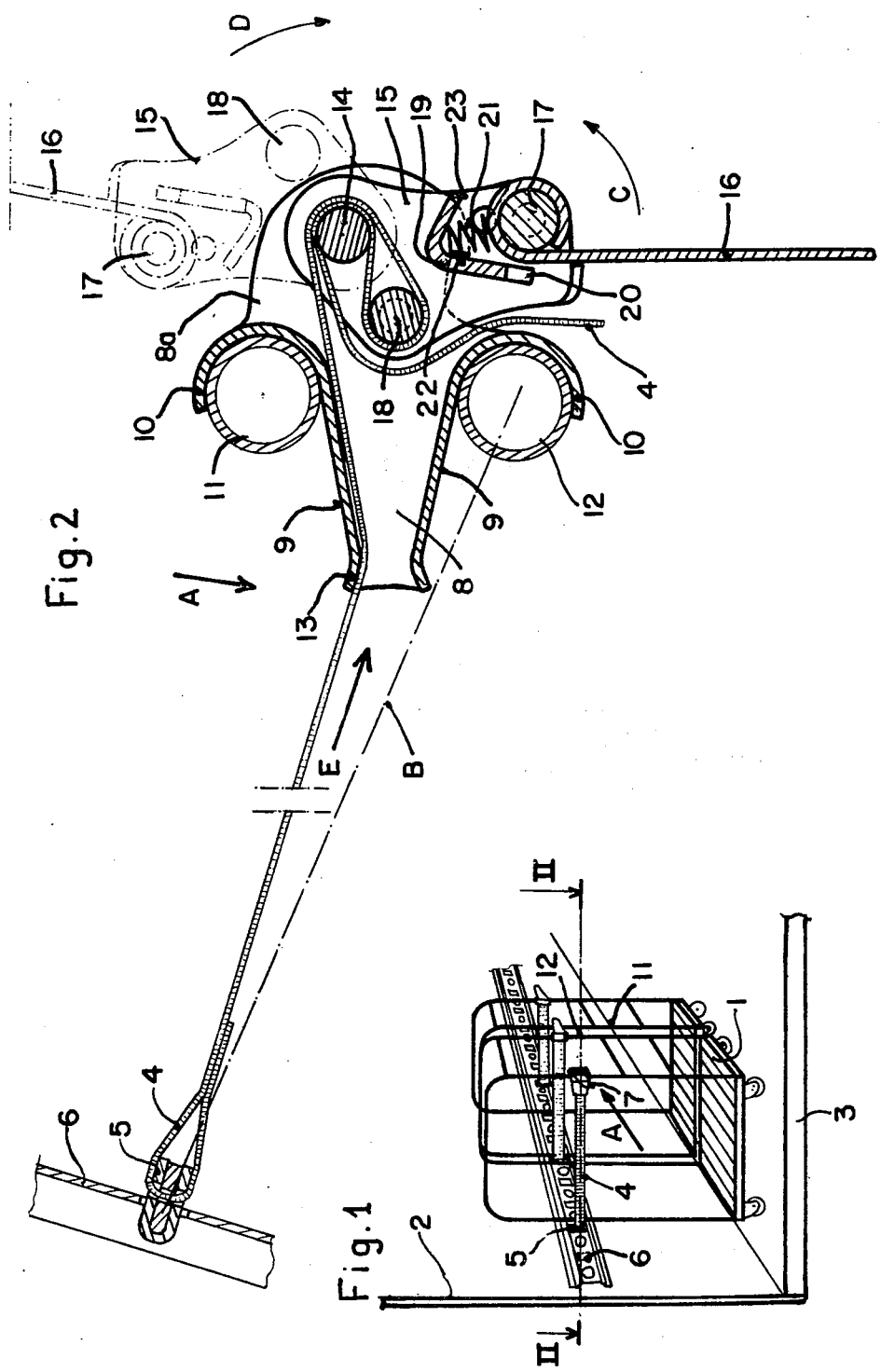

SYSTEM EMPLOYING A STRAP FOR STOWING CONTAINERS AGAINST A WALL

The present invention relates to a system employing a strap for stowing containers against a wall, and more particularly for stowing roll-containers inside trucks or other means of transport.

Different goods, particularly foodstuffs, are more and more frequently delivered to the retailers by means of roll-containers which are loaded at the wholesalers', for example, and transported in trucks. In certain cases, the roll-containers are unloaded as such as the retailers' and they may in that case be stowed by means of straps which girdle them. In other cases, the roll-containers comprise shelves or racks which are unloaded individually, and said containers therefore remain stowed. In this case, it is of course necessary that nothing hinders the removal of the shelves carried by the roll-containers.

It is an object of the present invention to provide a stowing system employing a strap, which allows effective and very simple stowing by fastening one end of the strap on one or more rails fixed along the inside walls of the truck or other means of transport.

More particularly, it is an object of the invention to provide a stowing system which allows either one roll-container or two juxtaposed roll-containers to be fastened, by means of one tightener.

It is a further object of the invention to provide a stowing system employing a strap, which allows a very effective and simple stowing to be effected without, however, after positioning, hindering the access to the inside of the roll-containers when said latter are stowed, in particular to permit the removal of shelves carried by the roll-containers.

This object is attained by a stowing system employing a strap, comprising an anchoring device for fastening a first end of the strap on the wall, and a tightener device with a lever provided with automatic locking means, in which is engaged the other or second end of the strap, the strap in stowed position being tightened by rotation of the lever and held under tension by locking, in which system, according to the invention, the tightener comprises; a tubular casing having an opening through which the strap is engaged in the tightener, the strap extending freely from the anchoring device as far as the entrance of this opening; two hooks located on either side of the casing, each hook being adapted to be engaged against an element of a container to be stowed; and a lever which is constituted in two parts movable with respect to each other, one of these parts comprising the free end of the lever and being retractable after the strap has been tightened.

According to a feature of the system according to the invention, the casing of the tightener comprises two parallel, substantially triangular faces and two rectangular sides which connect said triangular faces and form therewith a tubular conduit in the form of a frustum of a rectangular-based pyramid, the top of which defines said opening, said parallel faces each being extended, on the base side of the pyramid, by a cheek.

According to another feature of the system according to the invention, the lever comprises a first part which is pivoted about a pin borne by the casing and a second part which constitutes the free end part of the lever and which is pivoted with respect to the first part so as to be able to be folded down against said latter by rotation in a direction opposite that of the rotation of the lever for tightening the strap. As a variant, the retraction of the second part of the lever may be effected by longitudinal slide against the first part, instead of pivoting against said latter, the lever then being an element of the telescopic type.

The invention will be more readily understood on reading the following description with reference to the accompanying drawings, in which:

FIG. 1 is a perspective view showing the stowing of roll-containers against an inside wall of a truck, by means of systems according to the invention;

FIG. 2 is a longitudinal view of a stowing system according to the invention, seen in plan view in section along II—II of FIG. 1.

Referring now to the drawings, FIG. 1 shows, very schematically, the stowing of roll-containers 1 against the inside wall 2 of a truck 3 by means of straps 4. Each strap is provided at one end with a stowing device 5 which enables it to be fastened in a rail 6 fixed to the inside wall 2. The other ends of the straps are engaged in tightener devices 7 which, by abutment against the vertical uprights of the roll-containers, block said latter against the inside wall 2 on tightening the straps 4.

A tightener device 7 is shown in greater detail in FIG. 2. It comprises a tubular casing having two parallel triangular faces 8 and two rectangular sides 9 connecting faces 8. This casing is therefore in the form of a rectangular-based pyramidal tube, the truncated top of which defines a rectangular opening or slot 13 through which the strap 4 is introduced in the tightener and may slide, the edges of the opening being curved outwardly to avoid deteriorating the strap 4. At the base of the casing, the faces 8 are extended by parallel cheeks 8a.

Sides 9 are extended on either side of and outside the casing by identical curved portions 10 forming hooks. The hooks 10 are folded rearwardly in order to be engaged against adjacent tubular uprights 11, 12, of juxtaposed roll-containers, with a view to ensuring their simultaneous stowing. Of course, the hooks 10 will preferably be shaped so as to be adapted to the cross-section of the uprights 11, 12. It will be noted that the possibility of simultaneously holding two adjacent containers by means of one stowing system only, permits a maximum saving of time and space.

It is possible to stow a single container, in which case only one hook 10 is active. The system is aligned, in the direction B (FIG. 2), it being assumed that only upright 12 is held. This orientation of the hook produces a component of transverse force A (FIG. 1) which is compensated for by the abutment of the strap 4 under tension against an edge of the opening 13, hence the necessity of having a guide element of a certain length such as the tubular casing formed by the walls 8 and 9.

A tension lever constituted by two parts 15 and 16 is pivoted about a pin 14 carried by the cheeks 8a. The lever part 16 which constitutes the free end part thereof, may be folded against part 15 by pivoting about axis 17 in the direction of arrow C. In the other direction (arrow D), the part 16 unfolds into a position in abutment for which the length of the lever is maximum. As has already been mentioned, the part may be retracted differently, particularly by sliding. This retraction makes it possible, after stowing and tightening of the straps 4 with a suitable tension, but without effort due to the length of the tension lever, to fold the part 16 of each lever from its position illustrated in FIG. 2 in order totally to clear the front access to the stowed containers.

The part 15 of the lever is constituted by two cheeks connected by crosspieces 17 and 18 forming pivot pins. The parallel pivot pins 14 and 18 constitutes, with the lever, the tightener element of the strap 4 by self-tightening. Said strap passes over pin 14, then pin 18 and again over pin 14, in the direction contrary to that of the preceding passage. When the lever is in released position (in dashed and dotted lines in FIG. 2), the strap 4 may slide freely on pins 14 and 18. The strap 4 is tightened by the lever being folded down in the direction of arrow D to the position shown in solid lines in FIG. 2. During this rotation, there is self-tightening of the strap parts which overlap on the pin 14 hence winding of the strap around this pin, the strap extending with displacement in the direction of arrow E towards the inside of the tubular casing. In view of the ratio between the length of the lever and the radius of the pin 14, an effective tightening is therefore obtained without effort, the part 16 of the lever then being folded down in the direction opposite that of the arrow D.

The strap 4 is maintained under tension with the aid of an automatic locking pawl 19 which slides, as prisoner, in openings 20 provided in the cheeks 15. A spring 21 ensures the automatic action of the locking of the pawl 19 by engagement against stop notches 22 formed in the cheeks 8a. The shape of the pawl as right-angled bend enables it to be unlocked manually by action on the end 23 opposite the one engaged against the stop notches 22. It suffices, therefore, to actuate this end 23 in order to be able to return the lever into release position and unstrap the containers.

By way of variant, other tighteners with automatic locking lever may be used without departing from the scope of the invention. In particular, a cylindrical member may be used, passing through the cheeks 8a and comprising a passage for introduction and rotation of the strap for its tightening, and a ratchet wheel rotating with the cylinder and immobilised by a stop pawl drawn back by spring.

What I claim is:

1. A system for stowing roll-containers against a wall, comprising a strap, an anchoring device for fastening a first end of the strap on the wall, and a tightener device engaging the strap adjacent its second end, said tightener device comprising:
    a tubular casing comprising two parallel faces and two sides which connect said faces and form therewith a tubular conduit through which said strap extends, the strap extending freely from the anchoring device into the entrance at a first end of said conduit, the cross-section of said conduit increasing from said first end, each of said sides of said casing being extended outside said conduit and at the second end thereof opposite said first end of the conduit by an outwardly curved portion forming a hook directed towards said first end of the conduit, whereby each hook is adapted to be engaged against an element of a roll-container to be stowed;
    self-tightening means in said tightener device engaging said strap adjacent its second end;
    a tensioning rotatable lever for actuating said self-tightening means, the strap in stowed position being tightened by rotating said lever in a first direction and said lever being constituted at least in two parts movable with respect to each other, one of said parts comprising the free end of the lever and being retractable after the strap has been tightened; and
    locking means for holding the strap under tension after tightening thereof.

2. A system as claimed in claim 1, wherein said parallel faces of the casing are substantially triangular and said sides of the casing are rectangular to define a tubular conduit in the form of a frustum of a rectangular-based pyramid having its top at said first end of the conduit.

3. A system as claimed in claim 1, wherein said parallel faces of the casing extend outwardly at said second end of the conduit and defing cheeks between which pivot pins are mounted and on which is wound said second end of the strap.

4. A system as claimed in claim 1, wherein said lever comprises a first part which is pivotally mounted about a pin borne by said casing, and a second part which is pivotally mounted with respect to said first part, whereby said second part can be folded down against said first part by rotation in a direction opposite said first direction.

* * * * *